(12) United States Patent
Lindley et al.

(10) Patent No.: US 6,353,336 B1
(45) Date of Patent: Mar. 5, 2002

(54) ELECTRICAL ID METHOD FOR OUTPUT DRIVER

(75) Inventors: David R. Lindley; William G. Baker, both of Starkville; Jeffery Scott Hunt, Ackerman, all of MS (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/534,663

(22) Filed: Mar. 24, 2000

(51) Int. Cl.[7] ............................................. H03K 19/0175
(52) U.S. Cl. .............................. 326/83; 326/16; 326/87; 327/525
(58) Field of Search ............................. 326/16, 83, 86, 326/87, 89, 90, 91; 327/525

(56) References Cited

U.S. PATENT DOCUMENTS

| | | | |
|---|---|---|---|
| 4,625,311 A | * 11/1986 | Fitzpatrick et al. | ............ 326/16 |
| 5,424,982 A | * 6/1995 | Kato | ............................. 326/105 |
| 5,598,119 A | * 1/1997 | Thayer et al. | ................. 326/83 |
| 5,751,978 A | * 5/1998 | Tipple | .......................... 395/309 |

\* cited by examiner

*Primary Examiner*—Michael Tokar
*Assistant Examiner*—Don Phu Le
(74) *Attorney, Agent, or Firm*—Christopher P. Maiorana, P.C.

(57) ABSTRACT

An apparatus comprising a first circuit and a second circuit. The first circuit may be configured to generate a first output signal in response to one or more first input signals. The second circuit may be configured to generate a second output signal in response to one or more second input signals. The first and second output signals may be presented to a bond pad.

20 Claims, 2 Drawing Sheets

ELECTRICAL ID METHOD FOR OUTPUT DRIVER

FIELD OF THE INVENTION

The present invention relates to a method and/or architecture for an electrical identification (ID) generally and, more particularly, to a method and/or architecture for an electrical ID that may operate in conjunction with existing circuitry.

BACKGROUND OF THE INVENTION

An electrical ID may be needed during product qualification so that information such as (i) the wafer location of test or qualification failures, (ii) the circuit power supply voltage, (iii) wafer lot number can be identified (iv) other pertinent information. To indicate the electrical ID of a circuit, the status (i.e., blown or unblown) of a fuse or fuses within the circuit may be determined. Several conventional methodologies of electrical ID are currently employed. For electrical ID of input pads, a diode stack is connected to the input pad. If a particular fuse is unblown, a specified number of diode drops are measured when current is forced into the input. If the particular fuse is blown, a different number of diode drops are measured.

Some devices do not have enough input pads for full electrical ID. In particular, certain devices are implemented with bi-directional address ports in place of input pads. Such devices may have an insufficient number of input pads to implement a full electrical ID. A diode stack generally cannot be used for electrical ID on an output pad. The PMOS transistor drain diode in an output pad can mask the diode stack used for standard electrical ID because the turn on voltage of the transistor drain diode is lower than the diode stack.

For electrical ID using output pads, conventional approaches use a parallel in, serial out, shift register. The parallel input of the shift register is connected to a fuse bank. The shift register is used to serially shift out the status of the fuses. The use of a shift register is cumbersome and complex. The use of a parallel in, serial out, shift register is time consuming since the fuse status is read out serially.

Programmable Logic Devices (PLD) are sometimes implemented with extra programmable memory cells to store electrical ID data. Such additional cells have the disadvantage of increased cost, board area, etc.

SUMMARY OF THE INVENTION

The present invention concerns an apparatus for electrical identification comprising a first circuit and a second circuit. The first circuit may be configured to generate a first output signal in response to one or more first input signals. The second circuit may be configured to generate a second output signal in response to one or more second input signals. The first and second output signals may be presented to a bond pad.

The objects, features and advantages of the present invention include providing a method and/or architecture for implementing an electrical identification that may (i) be implemented on an input, output, and/or I/O bond pad, (ii) be implemented without a diode stack, (iii) retain the original speed of an output path, and/or (iv) provide an electric identification that may be a voltage level driven by the device tested.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
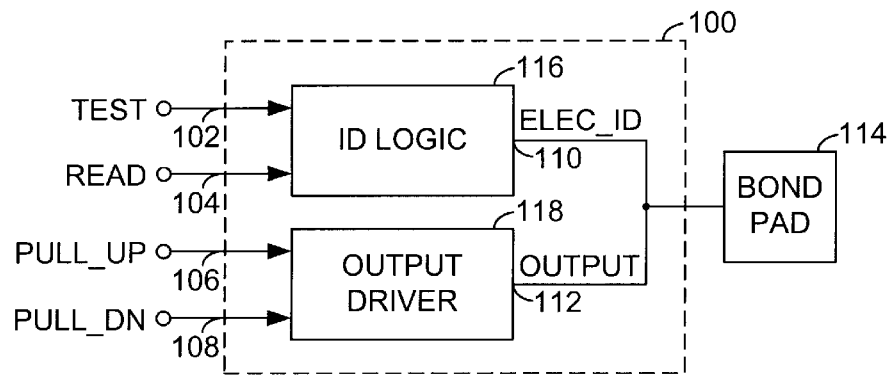
FIG. 1 is a block diagram of a preferred embodiment of the present invention.

Referring to FIG. 1, a block diagram of a circuit 100 illustrating a preferred embodiment of the present invention is shown. In one example, the circuit 100 may be an electrical ID/output driver circuit. In one implementation, the circuit 100 may comprise a circuit 116 and a circuit 118. In one example, the circuit 116 may be implemented as an electrical ID logic circuit. The circuit 118 may be implemented, in one example, as a conventional output driver circuit.

The circuit 100 may have an input 102 that may receive a signal (e.g., TEST), an input 104 that may receive a signal (e.g., READ), an input 106 that may receive a signal (e.g., PULL_UP), and an input 108 that may receive a signal (e.g., PULL_DN). The circuit 100 may have an output 110 that may present a signal (e.g., ELEC_ID), and an output 112 that may present a signal (e.g., OUTPUT). The signal ELEC_ID and the signal OUTPUT may be presented to a block (or circuit) 114. In one implementation, the block 114 may be a bond pad. The bond pad may be an input pad, an output pad, and/or an I/O pad. The signal ELEC_ID may be read from a programmable element (to be described in more detail in connection with FIG. 2).

Electrical ID using the circuit 100 may be performed by reading the value of the programmable element in the circuit 116. A number of circuits 116 may be implemented in an integrated circuit to provide a digital word that may be used for identification. When reading from the circuit 116, the circuit 118 may be placed in the tri-stated mode. The signal TEST may be asserted as logic "high" to the input 102. The signal READ may be asserted as logic "high" to the input 104. The signal ELEC_ID may be presented as either logic "high" or logic "low"0 based on two parameters. The first parameter may be the status (blown or unblown) of a fuse programmable logic element within the circuit 116. The second parameter may be the particular implementation of the circuit 116 (to be discussed in detail in relation to FIGS. 2 and 3). If either of the signals TEST or READ are presented at a logic "low" state, the signal ELEC_ID may be presented as a high impedance. The circuit 116 may include, but is not limited to, a fuse programmable logic element that presents a logic "low" or a logic "high".

The various signals are generally "on"(e.g., a digital "high" or 1) or "off" (e.g., a digital "low" or 0). However, the particular polarities of the on (e.g., asserted) and off (e.g., de-asserted) states of the signals may be adjusted (e.g., reversed) accordingly to meet the design criteria of a particular implementation.

During normal operation of the circuit 100 (e.g., using the circuit 118), the circuit 116 may be placed in the tri-stated mode. The signal PULL_UP may be asserted as logic "high" to the input 106. The signal PULL_DN may be asserted as logic "high" to the input 108. If either of the signals PULL_UP or PULL_DN are presented at a logic "low" state, the circuit 116 generally presents a high impedance output.

Figure 2:
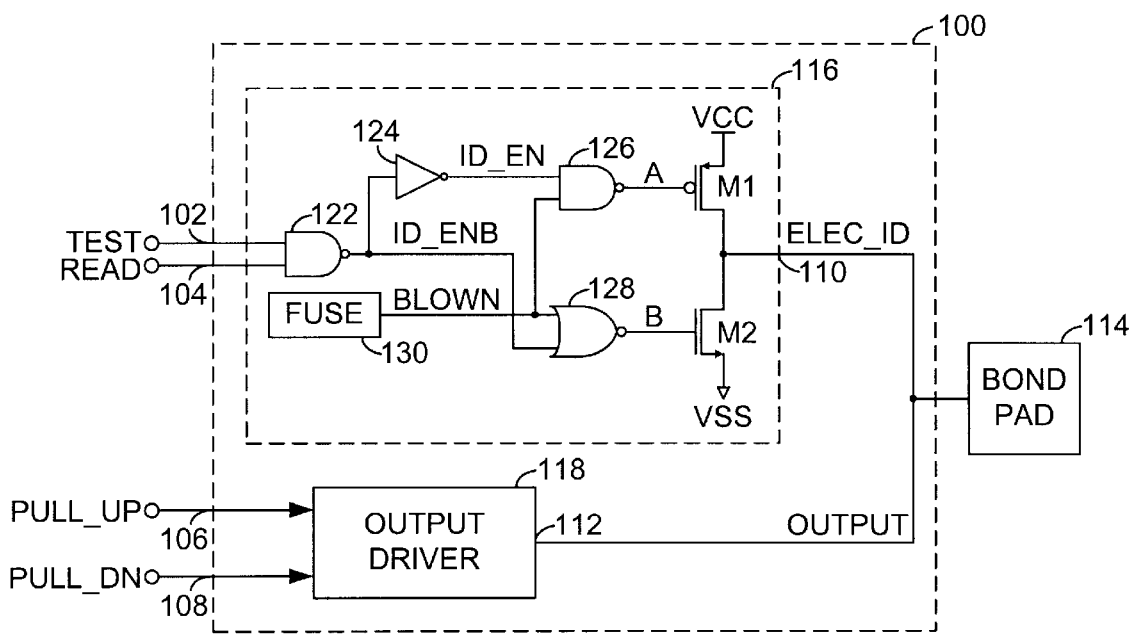
FIG. 2 is a more detailed diagram of the circuit of FIG. 1.

Referring to FIG. 2, a detailed diagram of the circuit 100 is shown. In one example, the structure of the circuit 116 may comprise a gate 122, a gate 124, a gate 126, a gate 128, an element 130, a transistor M1, and a transistor M2. In one implementation, the gate 122 may be a NAND gate. The gate 124 may be implemented as an inverter. In one implementation, the gate 126 may be a NAND gate. In one implementation, the gate 128 may be a NOR gate. The transistors M1 and M2 may be implemented as one or more MOSFET transistors. The element 130 may be, in one implementation, a programmable logic element (e.g., a fuselatch circuit, etc.). However, other implementations of the gates 122, 124, 126, 128, the element 130 and the transistors M1 and M2 may be used to meet the design criteria of a particular implementation.

In one implementation, the gate 122 may have a first input that may receive the signal TEST and a second input that may receive the signal READ. The gate 122 may present a signal (e.g., ID_ENB) to an input of the gate 124 and to a first input of the gate 128. The element 130 may present a signal (e.g., BLOWN) to a first input of the gate 126 and to a second input of the gate 128. The gate 124 may present a signal (e.g., ID_EN) to a second input of the gate 126. The gate 126 may present a signal (e.g., A) to a gate of the transistor M1. The gate 128 may present a signal (e.g., B) to a gate of the transistor M2. Transistor M1 may have a source that may receive a supply voltage (e.g., VCC), and a drain that may be connected to the output 110. The drain of the transistor M1 may be connected to a drain of the transistor M2. In one implementation, a source of the transistor M2 may receive a ground potential (e.g., VSS).

During an electrical ID operation, the signal TEST and the signal READ may be logic "high" signals. In one implementation, the element 130 may present the signal BLOWN as a logic "high" when an electrical ID fuse is blown. The signal BLOWN may be logic "low" if the electrical ID fuse is not blown.

In one example, the circuit 100 may implement the truth table as shown in the following TABLE 1. The logic states of the signals A and B are included for reference:

TABLE 1

| TEST | READ | BLOWN | A | B | ELEC_ID |
|------|------|-------|---|---|---------|
| 0    | X    | X     | 1 | 0 | Z       |
| X    | 0    | X     | 1 | 0 | Z       |
| 1    | 1    | 0     | 1 | 1 | 0       |
| 1    | 1    | 1     | 0 | 0 | 1       |

The value Z generally indicates a high impedance state. The circuit 118 may have similar logic to implement a high impedance state. In general, only one of the circuits 116 and 118 present a digital logic signal while the other is in a high impedance state. Therefore, the circuit 100 may read the value of the element 130 when in a test (or ID) mode, but provide an operational output driver 118 when not in the test mode.

Figure 3:
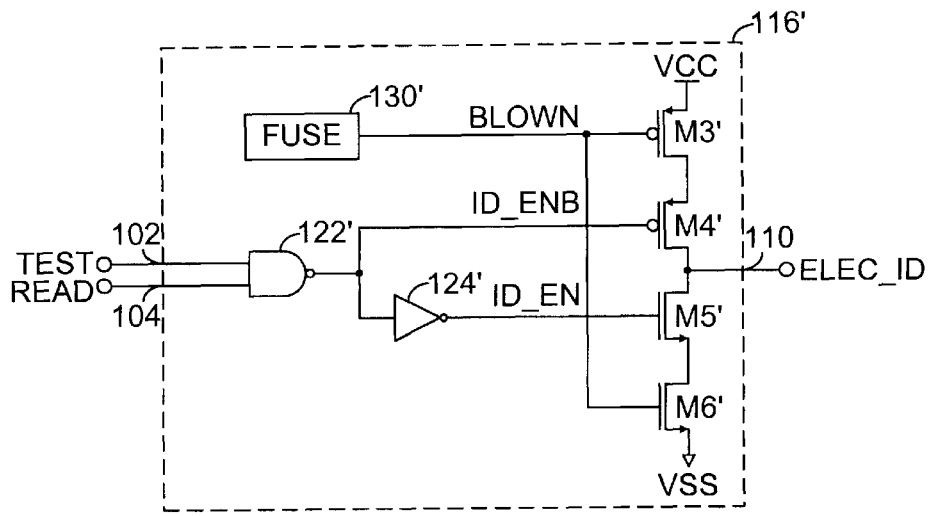
FIG. 3 is a more detailed diagram of an alternative embodiment of the present invention.

Referring to FIG. 3, a detailed schematic diagram of a circuit 116' illustrating an alternate embodiment of the present invention is shown. The structure of the circuit 116' generally comprises a gate 122', a gate 124', an element 130', a transistor M3', a transistor M4', a transistor M5', and a transistor M6'. In one implementation, the gate 122' may be a NAND gate. The gate 124' may be implemented as an inverter. In one example, the transistors M3'–M6' may be implemented as one or more MOSFET transistors. In one implementation, the gate 122' may have a first input that may receive the signal TEST and a second input that may receive the signal READ. The gate 122' may present the signal ID_ENB to an input of the gate 124' and to a gate of the transistor M4'. The gate 124' may present the signal ID_EN to a gate of the transistor M5'. In one implementation, a source of the transistor M3' may receive the supply voltage VCC. A drain of the transistor M3' may be connected to a source of the transistor M4'. A drain of the transistor M4' may, in one implementation, be connected to the output 110 and a drain of the transistor M5'. In one implementation, a source of the transistor M5' may be connected to a drain of the transistor M6'. A source of the transistor M6' may receive a ground potential (VSS) The element 130' may, in one implementation, present the signal BLOWN to a gate of the transistor M3' and a gate of the transistor M6'.

During an electrical ID operation the signal TEST and the signal READ may be logic "high" signals. The circuit 116' may implement the truth table as shown in the following TABLE 2:

TABLE 2

| TEST | READ | ID_EN | BLOWN | ELEC_ID |
|------|------|-------|-------|---------|
| 0    | X    | 0     | X     | Z       |
| X    | 0    | 0     | X     | Z       |
| 1    | 1    | 1     | 0     | 1       |
| 1    | 1    | 1     | 1     | 0       |

Figure 4:
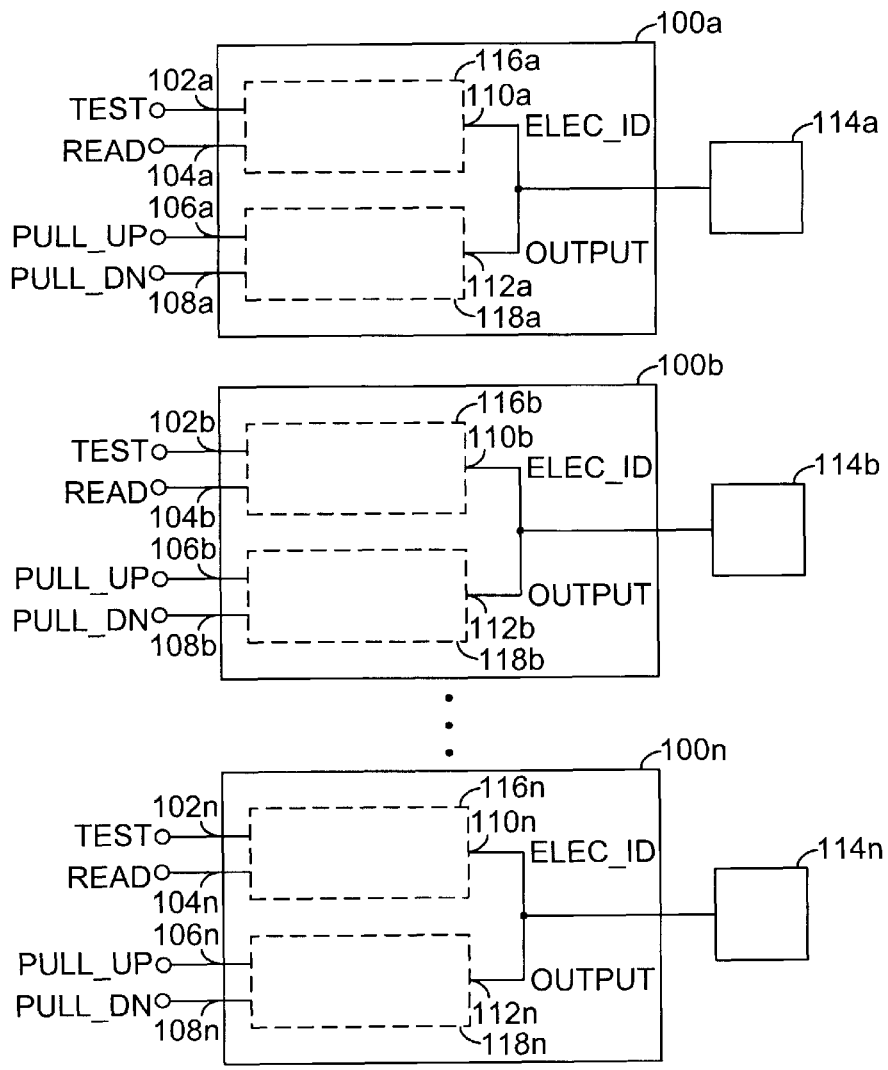
FIG. 4 is a block diagram of an implementation of a plurality of the circuits of FIG. 1.

Referring to FIG. 4, an example implementing a plurality of circuits 100a–100n is illustrated. By implementing a plurality of the circuits 100a–100n, a multi-bit digital word may be presented to one or more bond pads 114a–114n. The multi-bit digital word may provide particular information about an integrated circuit. For example, a digital word may identify a particular voltage level that the integrated circuit may operate at. Other examples may include, but are not limited to, particular operational characteristics of the integrated circuit in which the circuits 100a–100n are implemented. Since integrated circuits have a limited number of bond pads 114a–114n, by implementing the circuits 100a–100n, the bond pads 114a–114n may be used for presentation of the electrical ID when in the test mode and presentation of electrical signals when in an operational mode.

Electrical ID using the circuit 100 in accordance with the present invention may (i) be implemented on an input, output, or I/O bond pad, (ii) be implemented without the diode stack, (iii) retain the original speed of the output path, and/or (iv) provide an electrical ID that may be a voltage level driven by the device tested.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a first circuit comprising a programmable element and configured to generate a first output signal on a bond pad in response to a one or more first input signals; and
    a second circuit configured to generate a second output signal on said bond pad in response to one or more second input signals, wherein said apparatus presents either said first output signal or said second output signal.

2. The apparatus according to claim 1, wherein said bond pad is selected from the group consisting of input pads, output pads and I/O pads.

3. The apparatus according to claim 1, wherein:
said first circuit comprises an electrical identification circuit; and
said second circuit comprises an output driver circuit.

4. The apparatus according to claim 1, wherein said first output signal comprises an electrical identification signal.

5. The apparatus according to claim 4, wherein said electrical identification signal comprises (i) logic high or (ii) logic low.

6. The apparatus according to claim 4, further comprising a plurality of first circuits configured to present a plurality of electrical identification signals configured to generate a multi-bit digital word.

7. The apparatus according to claim 6, wherein said multi-bit digital word identifies one of a plurality of operational characteristics of a device.

8. The apparatus according to claim 4, wherein said first circuit generates said electrical identification signal in response to said programmable element within said first circuit.

9. The apparatus according to claim 8, wherein said programmable element comprises a fuse.

10. The apparatus according to claim 1, wherein said second output signal comprises a high impedance signal when said first output signal presents a digital logic signal.

11. The apparatus according to claim 1, wherein said first output signal comprises a high impedance signal when said second output signal presents a digital logic signal.

12. An apparatus for electrical identification configured to:
present a plurality of operational signals to a plurality of bond pads when in an operational mode; and
present a plurality of test signals to said plurality of bond pads when in a test mode, wherein presentation of said plurality of operational signals and said plurality of test signals is programmably controlled.

13. The apparatus according to claim 12, wherein said bond pad is selected from the group consisting of input pads, output pads and I/O pads.

14. A method for electrically identifying a device comprising the steps of:
(A) initiating a device test in response to one or more first input signals;
(B) temporarily disabling an operational circuit; and
(C) presenting an electrical identification signal in response to said one or more first input signals, wherein step (c) is programmably controlled.

15. The method according to claim 14, further comprising the step of:
enabling said operational circuit after reading said electrical identification signal.

16. The method according to claim 14, further comprising the step of:
presenting said electrical signal to a bond pad.

17. The method according to claim 16, wherein said bond pad is selected from the group consisting of input pads, output pads and I/O pads.

18. The method according to claim 14, wherein step (C) further comprises:
presenting a plurality of electrical identification signals configured to generate a multi-bit digital word.

19. The method according to claim 18, wherein said multi-bit digital word identifies one of a plurality of operational characteristics.

20. The method according to claim 14, wherein step (C) further comprises:
programmably controlling a fuse.

* * * * *